(12) United States Patent
Cook et al.

(10) Patent No.: US 8,640,653 B2
(45) Date of Patent: Feb. 4, 2014

(54) TWITCH TOY

(75) Inventors: Alan J. Cook, Chicago, IL (US); Kevin Augustyniak, Elma, NY (US); Gerard Fubershaw, Menlo Park, CA (US); Jeff Smith, Burlingame, CA (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 13/422,967

(22) Filed: Mar. 16, 2012

(65) Prior Publication Data

US 2012/0234258 A1    Sep. 20, 2012

Related U.S. Application Data

(60) Provisional application No. 61/453,139, filed on Mar. 16, 2011.

(51) Int. Cl.
*A01K 29/00*    (2006.01)

(52) U.S. Cl.
USPC .......................................... 119/708; 119/707

(58) Field of Classification Search
USPC .......................................... 119/702, 706–708
See application file for complete search history.

(56) References Cited

U.S. PATENT DOCUMENTS

| | | | | |
|---|---|---|---|---|
| 3,665,892 | A | * | 5/1972 | Kusisto .......................... 119/701 |
| 4,930,448 | A | * | 6/1990 | Robinson ....................... 119/708 |
| 4,940,018 | A |   | 7/1990 | Edling |
| 5,103,770 | A | * | 4/1992 | Berkovich ..................... 119/708 |
| 5,111,771 | A |   | 5/1992 | Mathews |
| 5,579,725 | A |   | 12/1996 | Boshears |
| 5,657,721 | A | * | 8/1997 | Mayfield et al. .............. 119/707 |
| 5,934,223 | A |   | 8/1999 | Ellery-Guy |
| 6,058,887 | A | * | 5/2000 | Silverman ..................... 119/609 |
| 6,360,694 | B1 | * | 3/2002 | Noto .............................. 119/707 |
| 6,550,426 | B2 |   | 4/2003 | Tsengas |
| 6,591,785 | B1 |   | 7/2003 | Boshears |
| 6,640,750 | B2 |   | 11/2003 | Rowe et al. |
| 6,701,872 | B1 |   | 3/2004 | Allen |
| 6,892,675 | B1 | * | 5/2005 | Comerford .................... 119/708 |
| 7,762,213 | B2 |   | 7/2010 | Cook et al. |
| 7,997,230 | B2 |   | 8/2011 | Cook et al. |
| D646,443 | S |   | 10/2011 | Cook et al. |
| 8,028,659 | B2 |   | 10/2011 | Cook et al. |
| 8,161,908 | B2 |   | 4/2012 | Cook et al. |
| D659,305 | S |   | 5/2012 | Song et al. |
| 8,166,918 | B2 |   | 5/2012 | Cook et al. |
| 8,166,919 | B2 |   | 5/2012 | Cook et al. |
| 8,166,920 | B2 |   | 5/2012 | Cook et al. |

(Continued)

OTHER PUBLICATIONS

Web page from www.frolicat.com for "Bolt" toy printed May 13, 2013 (3 pages).

(Continued)

*Primary Examiner* — Kimberly Berona
*Assistant Examiner* — Danielle Clerkley
(74) *Attorney, Agent, or Firm* — Baker Donelson; Peter L. Brewer

(57) ABSTRACT

A motorized cat toy having a suspended teaser toy at the end of a detachable stretchable string connected to a flexible swing arm biased against a waveguide within a housing having a programmable electronic control, a gearbox with meshing gears including one spur gear on the rotor of the motor to provide control of the teaser toy movement to include a twitch and other erratic movements pleasing to a cat.

1 Claim, 7 Drawing Sheets

(56) References Cited

U.S. PATENT DOCUMENTS

| | | |
|---|---|---|
| 8,328,368 B2 | 12/2012 | Luciano |
| 8,347,823 B1 | 1/2013 | Thomas et al. |
| 2007/0289550 A1* | 12/2007 | Huang .......................... 119/707 |
| 2011/0265728 A1 | 11/2011 | Cook et al. |
| 2012/0234258 A1 | 9/2012 | Cook et al. |
| 2012/0298049 A1 | 11/2012 | Cook et al. |
| 2013/0081577 A1 | 4/2013 | Morris |

OTHER PUBLICATIONS

Web page from www.frolicat.com for "Dart" toy printed May 13, 2013 (3 pages).
Web page from www. frolicat.com for "Sway" toy printed May 13, 2013 (3 pages).
Web page from www. frolicat.com for "Twitch" toy printed May 13, 2013 (3 pages).

* cited by examiner

TWITCH TOY

CROSS-REFERENCES TO RELATED APPLICATIONS

This application claims priority to U.S. Provisional Patent Application No. 61/453,139 filed Mar. 16, 2011, entitled Twitch Toy, the entire contents of which is incorporated herein by this reference.

FIELD OF INVENTION

This invention relates to cat toys, and more particularly to an electronically controlled cat toy that moves an enticing teaser toy tethered to an elastic cord with a twitch and erratic movement pursuant to a predetermined program.

BACKGROUND OF THE INVENTION

Cats enjoy playing and chasing an object that moves especially if the object is twitching or is erratically moving. So cat owners purchase a large number of toys to entertain their cats. Most toys are static objects that lose the interest of the cat after several minutes of play.

Cats are attracted to balls of twine, string and other similar small objects that are hit and bounced across the room with the cat's paws. Unfortunately, these objects end up underneath furniture, appliances, down basement stairs and generally lost in the recesses and corners of the home or apartment never to be seen again.

Therefore, prior art cat toys like U.S. Pat. No. 4,940,018 issued to Edling permit the toy member at the end of a string to move about as it batted by the cat in a generally erratic movement. The string is attached to the top of a flexible rod in a vertical position and mounted to a base member or platform by a coil spring. However, the cat learns that the flexible rod and string never changes that much from certain patterns of movement. The cat owner is able to remove the flexible rod with the toy member on the attached spring and create various manual movements with the cat. Although the manual mode provides a greater possibility of creative movement and fun for the cat owner, the busy schedules of most cat owners today often prevent such entertaining of their pets on a regular basis.

Also, many pet owners leave their cat for a day or so when traveling on business. During a period of absence, the cat owner can purchase from a pet store an automatic litter boxes and automatic feeders including water dispensers for their cat. But it is also important for the cat to remain amused and exercised during the owner's absence from the home. Cats have a tendency to get bored fast and a bored cat often gets into trouble by clawing things besides its claw post amongst other things.

Still other cat toys having an interesting cat movement are the type that hangs from door frames on a long string attached to the end of a pole or other arm extending horizontally from the hanger attached to the door frame. The problem with these cat toys is that the cat can scratch the door frame with its claw or the string that hangs some distance down on the frame of the door can catches on clothing or other articles that it comes into engagement causing problems.

Then there are prior art motor driven toys such as U.S. Pat. No. 5,579,725 issued to Boshears that has a generally hollow circular housing with a mouse attached to a rotating arm within the housing that has a number of ports on its outer perimeter for the cat to reach its paw within the hollow housing to bat the toy mouse. However, this motorized toy may end up with the cat injuring its paw if caught between the mouse and end of the opening as the mouse rotates around in a circle.

Therefore, a cat toy that includes a twitch and erratic movement of toy member like a ball at the end of a string or an elastic cord that is driven by an electronic control, which is programmable to entertain the cat whether the cat owner is home or gone away on a business trip but yet poses generally no potential injury threat to the cat and can be modified easily to change the teaser toy member attached to the end of the string or elastic cord. The present invention accomplishes these objectives and more.

SUMMARY OF THE INVENTION

The present cat toy is designed for attaching to a flat surface such as a kitchen countertop, coffee table, desktop or other convenient flat surface.

An interchangeable teaser toy member is tethered or suspended on a stretchable string, cord or line detachably attached to a distal end of a flexible coil spring of a predetermined length that in turn is detachably attached by turning the coil at its other end over a threaded end of a rigid rod to form a generally flexible horizontal swing arm extending out of a generally cylindrical domed shaped housing comprised of two parts including a rotatable dome top and stationary base member. The dome housing having an electronic controller with a predetermined program therein for programming a motor mounted within the housing to move the swing arm vertically up and down as the rotatable dome top rotates the swing arm from left to right and vice versa in a predetermined twitch and erratic movement to excite the cat to play with the tethered teaser toy member.

The electronic controller connected between the motor and a power source causes the motor to drive the swing arm at different speeds and in different movements up and down as it rotates from side to side in a predetermined arch. The electronic controller is capable of being programmed in many different configurations for the enjoyment of the cat.

BRIEF DESCRIPTION OF THE DRAWINGS

To understand the present invention, it will now be described by way of example, with reference to the accompanying drawings in which.

DETAILED DESCRIPTION

While this invention is susceptible of embodiments m many different shape and size, the present invention is shown and described in the attached drawings.

Figure 1:
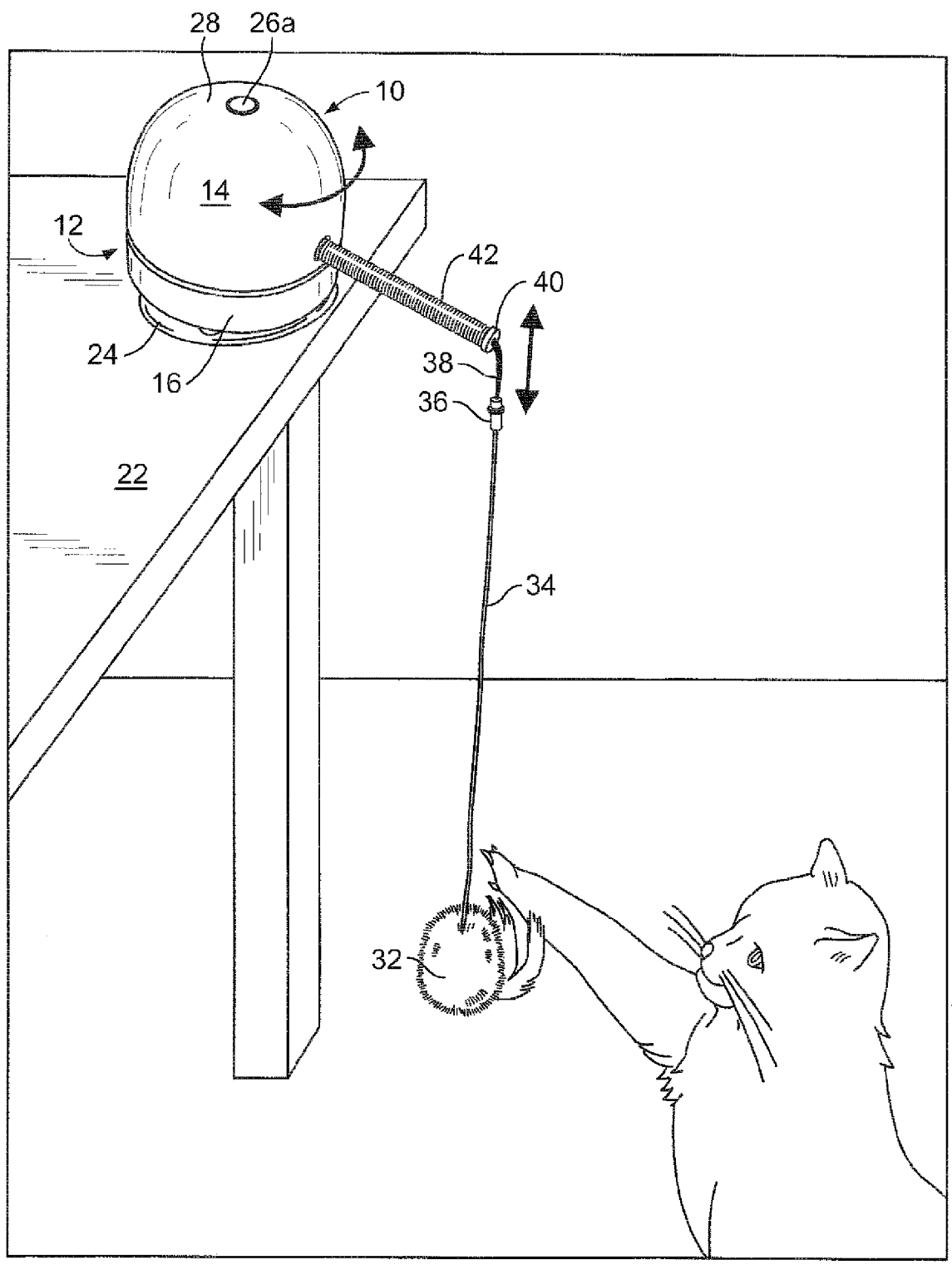
FIG. 1 is a perspective view of a cat toy according to the present invention mounted on a table top.
Figure 2:
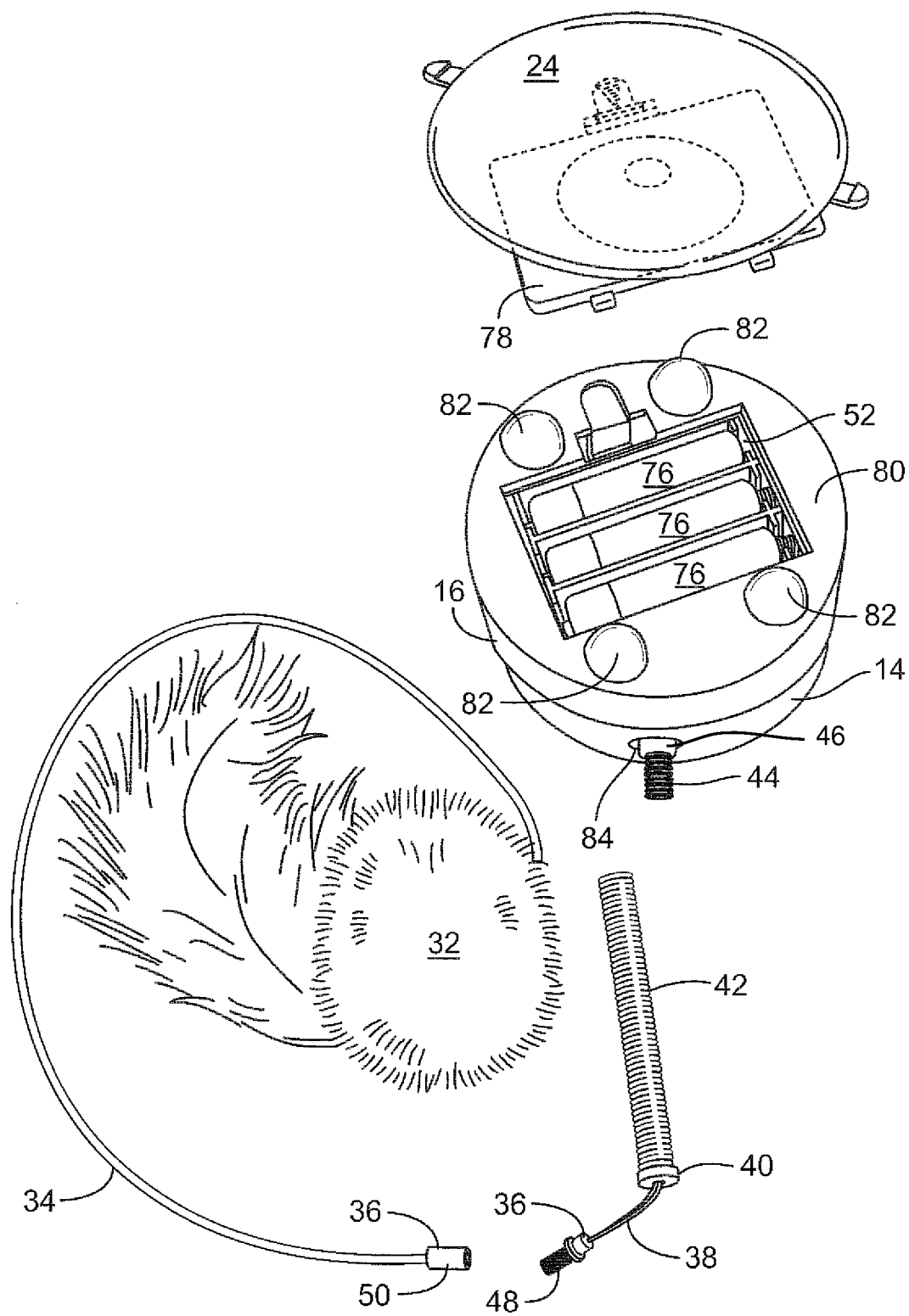
FIG. 2 is a bottom perspective view of the cat toy with the battery cover, dome housing with post end, flexible coil arm, lanyard with teaser toy member of FIG. 1.
Figure 3:
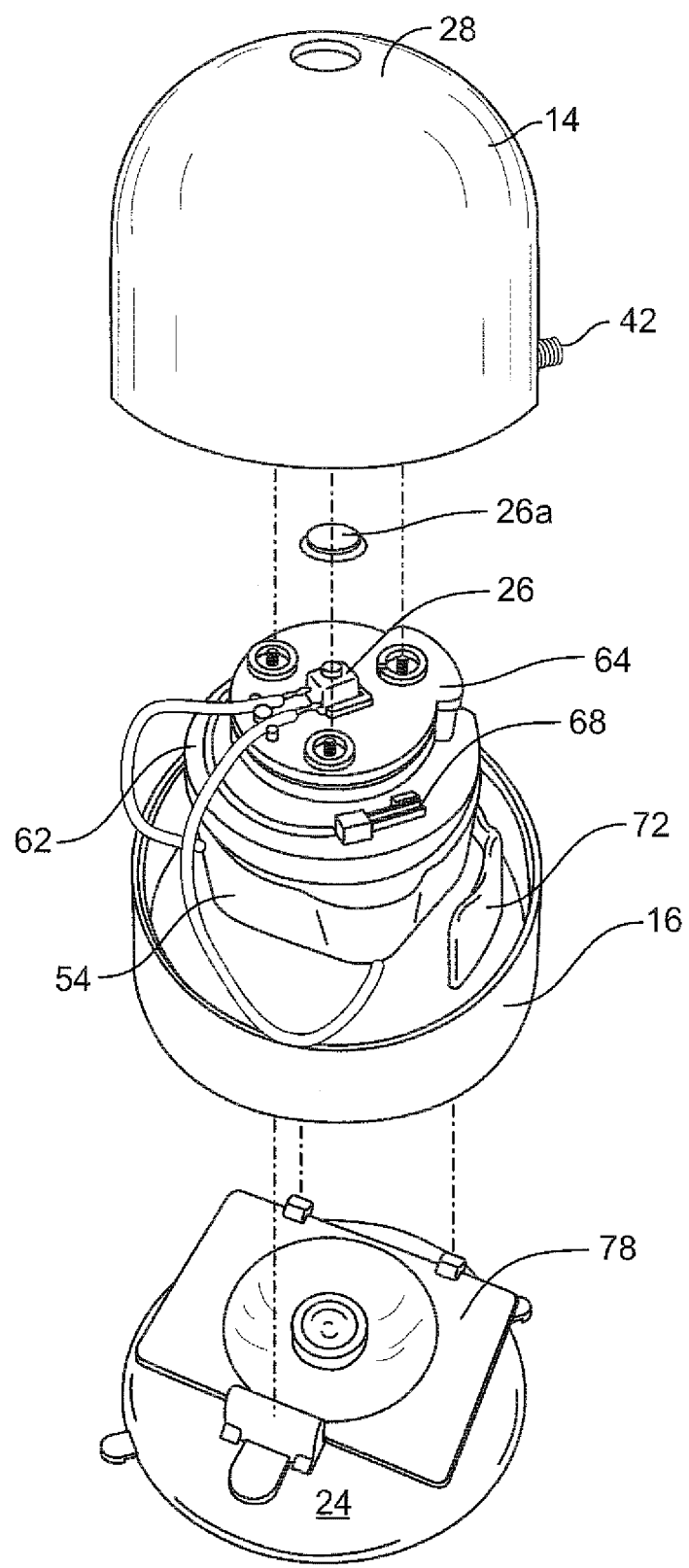
FIG. 3 is a perspective view of the cat toy of FIG. 1 with the rotatable dome member lifted off the base member showing the assembled contents of the top switch, right limit stop switch, motor housing all mounted within the dome housing of FIG. 1.
Figure 4:
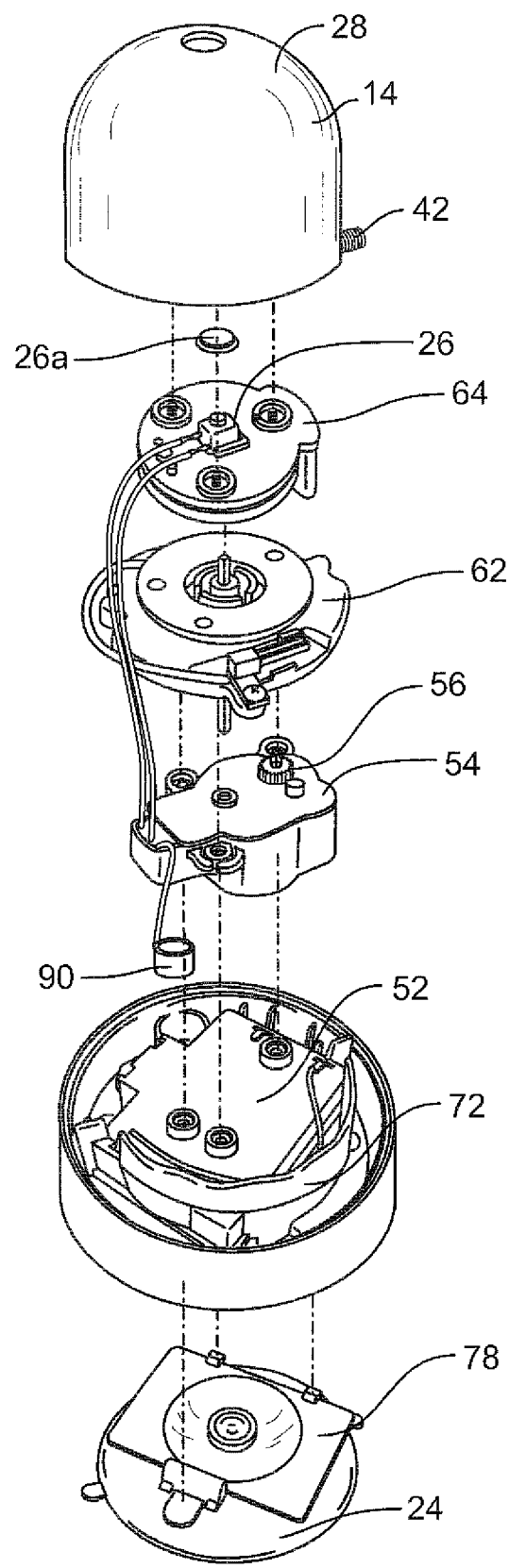
FIG. 4 is a top perspective and exploded view of the toy members with the battery cover and suction cup detached of FIG. 1.
Figure 5:
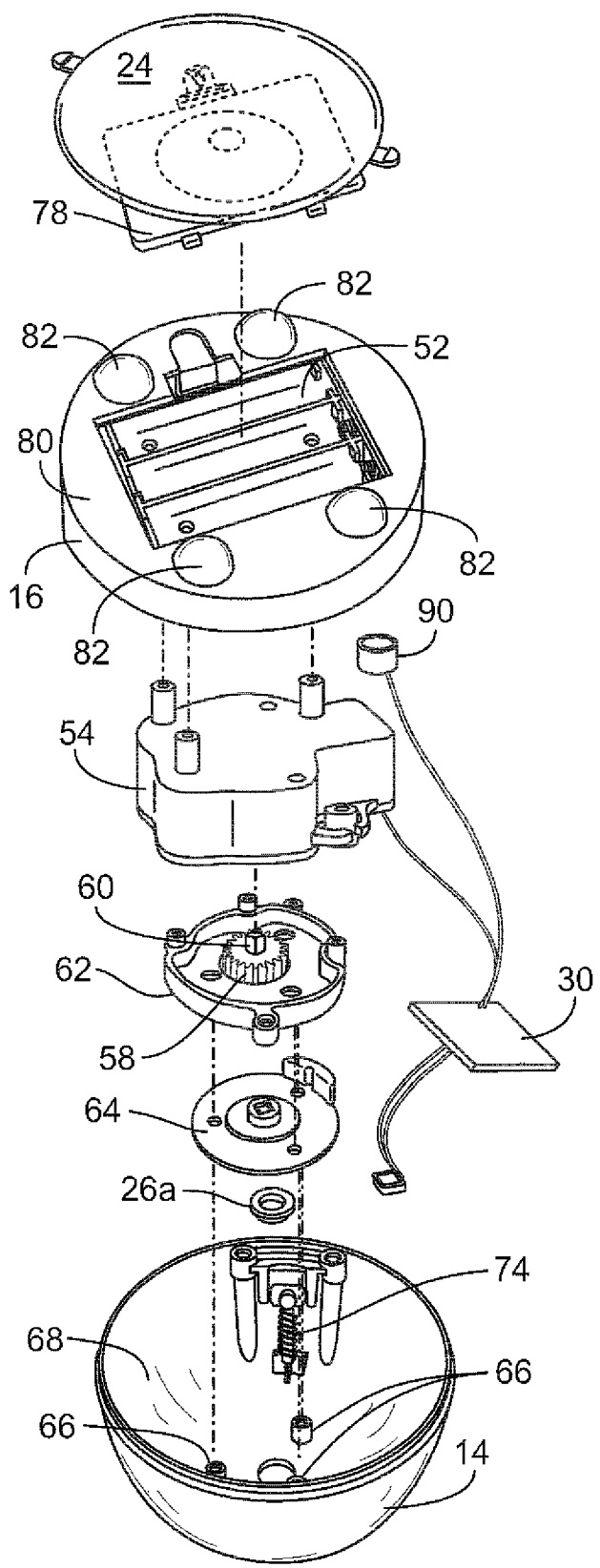
FIG. 5 is a bottom perspective and exploded view of the toy members with the battery cover and suction cup detached of FIG. 1.
Figure 6:
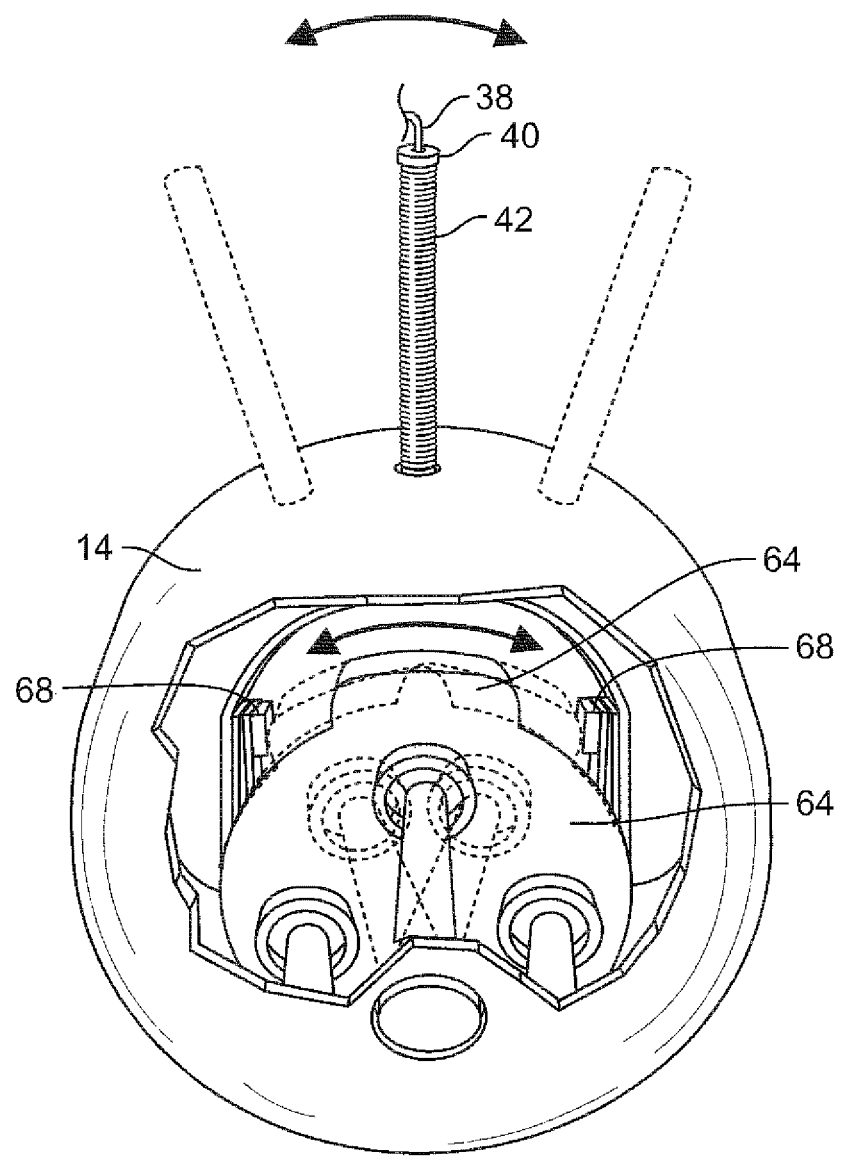
FIG. 6 is a top cut away of the turret dome with a partial interior view of the components engaging the right and left stop limit switches that controls the are of the post and flexible arm of the present invention as shown in FIG. 1.
Figure 7:
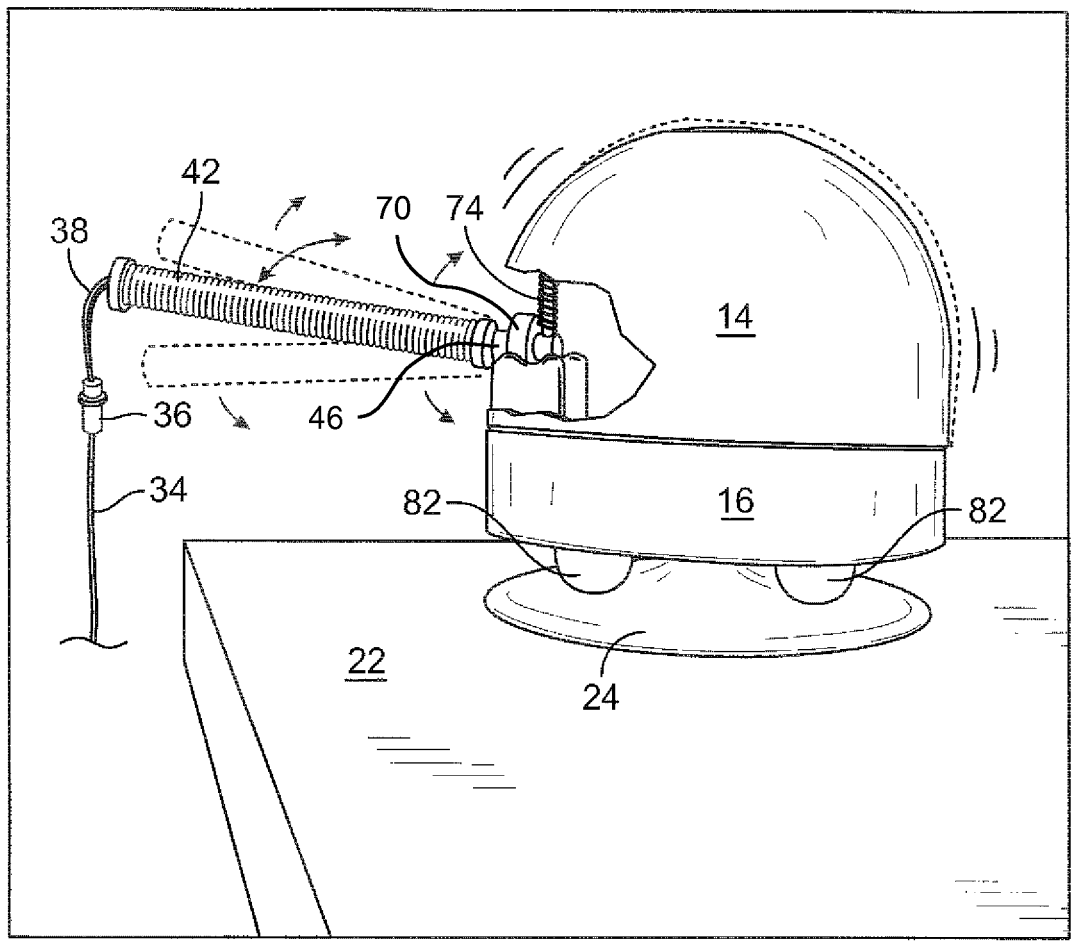
FIG. 7 is a partial cut away of the turret member of the dome housing showing the rigid post riding on top of a wave surface mounted on the base member to provide the up and down movement of the rigid post and flexible arm attached thereto in accordance with the present invention of FIG. 1.

FIGS. 1-7 show a cat toy 10 having a two piece cylindrical or dome shaped housing 12 having two halves, a rotatable dome or turret top 14 that engages and rides on top of a stationary base 16. Therefore, the dome housing splits apart into two cylindrical halves 14 and 16 that rotates with respect to each other. The dome top 14 and the stationary base 16 include keyed matching circumferences 18 and 20, respectively, where the two keyed halves 18 and 20 when keyed together form complementary surfaces where the turret top 14 rides on the stationary base 16 as shown joined together in FIG. 1.

The bottom half or base 16 of the cylindrical shape housing 12 is stationary and mounted to a flat surface 22 such as a glass coffee table or a marble kitchen countertop by a suction cup 24 during operation of the cat toy 10. The suction cup allows attachment of the toy to any smooth surface.

The top half dome or turret 14 of the cylindrical shaped housing 12 includes a switch or power button 26 generally mounted in the top center 28 of the dome or turret 14 to turn the toy on an off. The switch 26 serves as a means to select different modes of play by initiating pre-installed programs installed in an electronic controller 30 such as electrical components mounted on a printed circuit board (PCB), Application Specific Integrated Chip (ASIC) or a microprocessor mounted on the PCB to form the electronic controller for the cat toy 10. Therefore, the preselected programs are responsive to pressing the power button or switch 26. A single press of the power button 26 causes a single play session of approximately 10 minutes or any length of time desired where the toy automatically bounces and swings an enticing teaser toy 32 tethered on an elastic cord or lanyard 34 connected through a detachable coupling device 36 attached at one end by a short and similar elastic cord 38 to a distal end 40 of a flexible spring coil arm 42 of a predetermined length that screws onto threads 44 on a distal end of a rigid post 46 to be described in greater detail later.

The toy member 32 may be interchangeable that is tethered or suspended on the stretchable string, cord, lanyard or line detachably attached by the coupling mechanism 36 to the distal end 40 of the flexible coil spring 42 of a predetermined length. The coupling mechanism 36 includes a two piece metal disconnect 36 including a male and female ends 48 and 50, respectively, that provides a screw together connection for the coupling mechanism. The flexible coil spring 42 that is made out of any metal or plastic type materials includes an open end that attaches by screwing the open end over the threaded distal end 44 of the rigid rod or post 46 movably anchored to the bottom half or base 16 of the cylindrical housing 12 that forms the generally horizontal orientated swing arm 42 extending out from the lower half or base 16 of the cylindrical shaped housing 12 wherein the keyed circumference 18 of the dome top or turret 14 rotatably glides upon the complementary keyed circumferences 20 of the base 14.

The domed housing 12 includes the electronic controller 30 mounted between a battery compartment 52 and a motor housing 54 with a motor therein (motor not shown) where the motor housing 54 is fixedly attached to the battery compartment by a set of screws. Extending upwardly from the top of the motor 54 is the motor shaft with a first circular motor gear 56 that engages a second circular transmission gear 58 with a square transmission shaft 60 through its center. The square transmission shaft 60 is captured at one end in a recess on the top surface of the motor housing 54 so the second transmission gear teeth engage the teeth of the first motor gear and the other end of the transmission shaft 60 extends upwardly through a transmission housing 62 affixedly attached to the motor housing 54 via a set of screws into a square hole on a camming plate 64 fixedly attached to posts 66 extending upwardly on an interior wall 68 of the dome 14 by a set of screws.

As the motor within the motor housing 54 turns the first motor gear and its gear teeth which engage the gear teeth of the second transmission gear. The second gear then turns the transmission shaft 60 so that the camming plate 64 affixed to the interior wall 66 rotates the dome 14 back and forth. The back and forth arc movement of the dome 14 is controlled by a pair of stop limit switches 68 mounted on the top of the transmission housing 62 a predetermined spaced apart distance to define the arc of travel of the flexible arm 42 with the tethered toy 32 Therefore, as the dome 14 rotates, the other end of the post 46 has a knurl 70 that rides on top of a wave guide 72 mounted within the housing base 16 to move the swing arm 42 vertically up and down and to rotate the swing arm 42 from left to right and back again in a predetermined twitch and erratic pattern in order to excite a cat into playing with the toy member 30. The post 46 and knurl 70 includes a spring 74 that bias the knurl 70 against the top of the wave guide 72

A power source 76 comprises 3 AAA batteries located within a battery compartment 52 have a battery door 78 located and recessed into a generally flat circular bottom surface 80 on the lower half or base 16 of the housing 12. The suction cup 24 is fixedly attached to the center of the battery door 78 for pressing onto a flat surface to engage the suction cup 24. The suction cup makes sure that the cat toy is anchored well when the cat bats the ball with a feather and bell which comprises the cat toy member at the end of the elastic string 34. Also, the bottom surface 80 further includes 4 spaced apart feet 82 generally located at the circumference edge of the bottom surface 80 to stabilize the unit.

By pressing the power switch 26, a noise like a bird chirping occurs or simulated mouse noise or a host of other pleasing animal or other sounds on a speaker 90 that will attract the attention of the cat when the toy initially powers up. The end user presses and releases the power button on top of the dome accordance with any number of pre-programmed control functions that might be desired for the toy to operate in a certain mode or condition. The cat toy includes a program in the electronics on board the unit that will automatically turn off the toy after 10 minutes of operation. If the cat owner wish to end the play session of the cat before the toy automatically turns off, the owner presses and releases the power button once and the toy turns off.

Yet another potential function might be a "Play while your away" mode. To activate a multiple play session throughout the day where the user presses and holds the power button momentarily until the toy chirps three times. The three audible chirps indicate that the toy will cycle through at least three play sessions or more. After the first play session ends, the next play session begins approximately 2 hours after the preceding session. Of course, the exact time of each session is capable of being set at any pre-programmed time that is desirable by the end user. A feature built into the programming causes the toy to chirp twice at the beginning of the second play session to indicate the toy is cycling through the second play session. Then the toy chirps one time at the beginning of the last scheduled pay session to indicate that it is the last session. Each play session lasts approximately 10 minutes and the time between sessions is approximately 2 hours of time. Therefore, the total "play while your away" session is 4.5 hours. In addition, if the user presses and releases the power button while the toy is resting between play sessions, the toy will chirp once and turn on for a single 10 minute play session. Also, the end user can press the button to turn off the toy or press and hold as stated before to restart "play while your away" mode. Next if the end user presses and holds the power button while the toy is resting between play sessions, the toy will chirp three times and restart "play while your away" mode.

Another aspect of the present invention using the disconnect male and female threaded metal connector allows the user to replace the toy member or teaser at the end of the string for the cat to play. You can change to a mouse teaser from a ball teaser or vice versa. In short, if the teaser becomes worn out during cat play sessions, it is easily replaced in seconds with a new or other exciting teaser.

Now turning to the figures that show more details of the cat toy, the two halves of the cylindrical house includes the various operating components that make it an exciting cat toy with a teaser at the end of the flexible string that provides hours of playtime for the cat. The top half includes the power switch located flush with the top of the dome. The switch is connected to the power button at the top of the dome. The power switch 26 is located next to the gear transmission housing 62 where two meshing gears 56 and 58 are transmitting rotational motion to the top housing halve 14 with respect to the stationary bottom housing halve 16. The smaller gear 56 is a spur gear attached to a rotor of a motor (not shown) within a motor housing 54. The smaller spur gear is rotating faster than the larger wheel gear but the torque is proportionally greater on the larger wheel gear for rotating the upper housing with the swing arm 42 attached thereto. The rod or post 46 attached to the spring coil arm 42 extends through an opening 84 in the side of the upper dome housing 14. The rod end within the housing ends in a bulbous or knurl termination with a downwardly pointed finger engage a biasing spring attached between the distal end of the finger and a post hanging down from the dome toward the finger for biasing the rod to point upwardly as it passes through the rod hole in the side of the upper housing and therefore the swing arm is biased upwardly from a horizontal relationship with surface that the cat toy is has it suction cup attached to the mounting surface for the toy.

Between the switch and an electronic circuit board are several wires making the electrical connections to the programmable circuitry of the toy. Two wire leads are connected to the motor through its housing for powering the motor upon receipt of certain control signals from pressing and releasing the power button in a predetermined sequence referred to above. The electronic circuit board also has two wire leads connecting to the battery power source where 3 AAA batteries are connected in series to one another. As the motor receives control signals it spur gear meshing with the wheel gear turning the upper housing right to left and left to right in predetermined and complex patterns of movement. The bulbous end engages and follows a wave guide 666 located on the lower housing unit causing the rod to move up and down as it follows the waveguide while being biased against the top of the waveguide by the bias spring. This results in the swing arm and the coil spring to move up and down in an erratic manner and thereby moving the teaser or toy member at the end of the stretchable string to bounce and flip the teaser in an attractive pattern for a cat. The electronics circuit board of the toy is a capable of being incorporated into a single Application Specific Integrated Chip or ASIC that is programmable to incorporate additional features required by a cat owner.

The rotation between the upper and lower housing parts includes the keyed mating members that includes an inner circumference lip and an outer circumference lip, respectively, when the lips are mated together to form interlocking surfaces between the upper and lower housing parts for rotating the swing arm approximately 110 degrees from one side to the other as the bulbous end of the rod rides on top of the waveguide during the rotational movement of the upper and lower housing parts with respect to each other. The lower housing part with its four feet sitting on top of the suction cup pressed against a glass or other similar mounting surface remains stationary as the upper housing part rotates in a controlled manner approximately in a 110 degree arch.

Three screws pass through the battery compartment and fasten to three corresponding posts on one side of the motor housing. An offset space is created between one flat side of the motor housing and the battery compartment by the three posts. The electronic circuitry board is located within this offset space. The other flat side of the motor housing forms one flat side of the gearbox housing where the spur gear and wheel gear mesh together. Three screws pass through screw holes in three corresponding ears mounted on the periphery of the other flat side and are aligned with three corresponding screw holes mounted on the sides of the gearbox to fasten the motor housing securely to the gearbox. The wheel gear includes a rectangular shaped axle passing through the axis of the wheel and generally in line with the axis of the cylindrical housing to engage a post connection to the dome of the upper housing for rotating the housing upper housing when the motor rotor turns upon receiving control commands from the electronic circuitry.

Having thus described the invention, we claim:

1. A cat toy, comprising:
 a generally cylindrical two piece housing having an upper portion and a lower portion in which one portion rotates and the other is stationary;
 a power source connected within the housing;
 an electronic circuit programmed to move the one rotating portion of the housing;
 a motor having a shaft controlled by the programming of the electronic circuit for controlling the movement of the one rotating portion of the housing;
 a wave guide mounted within the housing configured to move a flexible swing arm in an up and down motion as the one rotating portion of the housing rotates;
 a generally stretchable line connected to a distal end of the swing arm;
 a teaser toy suspended from an end of the line connected to the distal end of the swing arm; and
 whereby the swing arm moves in both a horizontal plane and a vertical plane in an erratic pattern in response to the programming of the electronic circuit.

* * * * *